United States Patent [19]
Lee

[11] Patent Number: 5,699,201
[45] Date of Patent: Dec. 16, 1997

[54] LOW-PROFILE, HIGH-GAIN, WIDE-FIELD-OF-VIEW, NON-IMAGING OPTICS

[75] Inventor: Gregory S. Lee, Mountain View, Calif.

[73] Assignee: Hewlett-Packard Co., Palo Alto, Calif.

[21] Appl. No.: 410,953

[22] Filed: Mar. 27, 1995

[51] Int. Cl.[6] ............... G02B 3/02; G02B 3/06; G02B 17/00
[52] U.S. Cl. ............. 359/708; 359/709; 359/714; 359/718; 359/728
[58] Field of Search ............. 359/708, 709, 359/711, 718, 719, 728

[56] References Cited

U.S. PATENT DOCUMENTS

| | | | |
|---|---|---|---|
| 1,977,689 | 10/1934 | Muller | 359/728 |
| 2,254,961 | 9/1941 | Harris | 359/718 |
| 3,711,722 | 1/1973 | Kavanagh | 359/711 |
| 3,923,381 | 12/1975 | Winston | 350/293 |
| 3,957,031 | 5/1976 | Winston | 126/270 |
| 4,002,499 | 1/1977 | Winston | 136/206 |
| 4,003,638 | 1/1977 | Winston | 350/293 |
| 4,045,246 | 8/1977 | Mlavsky et al. | 136/89 |
| 4,114,592 | 9/1978 | Winston | 126/270 |
| 4,130,107 | 12/1978 | Rabl et al. | 126/270 |
| 4,230,095 | 10/1980 | Winston | 126/439 |
| 4,237,332 | 12/1980 | Winston | 136/259 |
| 4,240,692 | 12/1980 | Winston | 350/69.1 |
| 4,325,612 | 4/1982 | Clegg | 350/432 |
| 4,359,265 | 11/1982 | Winston | 350/296 |
| 4,387,961 | 6/1983 | Winston | 350/296 |
| 4,483,007 | 11/1984 | Winston | 372/72 |
| 4,657,353 | 4/1987 | Clegg | 350/432 |
| 4,753,520 | 6/1988 | Silverglate | 359/728 |
| 4,770,514 | 9/1988 | Silverglate | 359/708 |
| 4,964,025 | 10/1990 | Smith | 362/346 |
| 5,005,958 | 4/1991 | Winston et al. | 350/442 |
| 5,237,641 | 8/1993 | Jacobson et al. | 385/146 |
| 5,271,077 | 12/1993 | Brockman et al. | 385/31 |
| 5,285,318 | 2/1994 | Gleckman | 359/709 |
| 5,323,414 | 6/1994 | Baird et al. | 372/75 |
| 5,343,330 | 8/1994 | Hoffman et al. | 359/708 |
| 5,357,101 | 10/1994 | Plesko | 250/216 |
| 5,485,317 | 1/1996 | Perissinotto et al. | 359/718 |

OTHER PUBLICATIONS

Patent Abstracts of Japan, vol. 13, No. 200 (P-869), May 12, 1989, JP 1 021402, Mitsuhisa Matsuoka, "Optical And/Or Thermal Collecting And Transmission Equipment".

"The Optics of Nonimaging Concentrators: Light and Solar Energy", R. Winston, Academic Press, Inc., Chapter 5 pp. 69, 70, 72, 74, 76, 78.

*Primary Examiner*—David C. Nelms
*Assistant Examiner*—Jordan M. Schwartz
*Attorney, Agent, or Firm*—Jack A. Lenell

[57] ABSTRACT

A two stage non-imaging optical concentrator providing high concentration while providing a low aspect ratio and a wide field of view. The invention includes a non-imaging refractive member and a non-imaging reflective funnel member. The reflective funnel has a broad extremity and an opposing narrow extremity. The refractive member is disposed substantially within the funnel, proximate to the narrow extremity of the funnel, so as to provide a low aspect ratio of the two stage non-imaging concentrator of the invention. The low aspect ratio of the concentrator of the invention advantageously provides for compact and efficient packaging of the concentrator in conjunction with mobile optical communication link components.

20 Claims, 9 Drawing Sheets

LOW-PROFILE, HIGH-GAIN, WIDE-FIELD-OF-VIEW, NON-IMAGING OPTICS

FIELD OF THE INVENTION

The invention generally relates to optical concentrators and more particularly relates to non-imaging optical concentrators.

BACKGROUND OF THE INVENTION

Optical concentrators are needed in applications such as mobile optical communications links. High concentration is needed to maximize signal to noise ratio and thereby maximize data rate. Concentration of a wide field of view is also needed to maintain optical communication with the concentrator without being burdened by maintenance of a precise orientation of the concentrator.

Various optical concentrators are known in the art. Modernly, optical concentrators are categorized as either imaging concentrators or non-imaging concentrators. Examples of imaging concentrators are classical spherical lenses (thin or thick) and reflective parabolic dishes. While imaging concentrators have been highly perfected over centuries for forming images, they are far from optimal in achieving high concentration of light for a wide field of view.

Although a non-imaging concentrator does not form images, it can be designed to be very nearly optimal in concentrating light. An optical entrance aperture of the concentrator provides a light acceptance region for gathering light. The gathered light is concentrated onto a target region provided by an optical exit aperture of the concentrator. An example of a single stage non-imaging concentrator is a Compound Parabolic Concentrator (CPC) as described by Welford and Winston in "The Optics of Nonimaging Concentrators", Academic Press, 1978, pp. 69–79, which are incorporated herein by reference for background informational purposes. CPC type single stage non-imaging concentrators having various height dimensions and corresponding light ray acceptance angles, θ, ranging from ten degrees to twenty five degrees are shown in cross sectional view in FIG. 1. Non-imaging concentrators having wide acceptance angles advantageously provide a wide field of view.

Aspect ratio of a concentrator is defined as a ratio of the height dimension of the concentrator to the diameter of the optical exit aperture of the concentrator. Since the measure of the diameter of the optical exit aperture is the same as the measure of the diameter of the target region, the aspect ratio of the concentrator is alternatively defined as a ratio of the height dimension of the concentrator to the diameter of the target region provided by the optical exit aperture. Concentrators having low aspect ratio advantageously provide for compact and efficient packaging of mobile optical communication link components. Fortunately, low profile concentrators having desirable low aspect ratios also have preferred wide acceptance angles to provide wide field of view, as illustrated in FIG. 1. Unfortunately, low profile concentrators provide less concentration of light than that which is provided by high profile concentrators.

Concentration ratio is defined herein as a ratio of the area of optical entrance aperture of the concentrator to the area of the optical exit aperture of the concentrator. Since the measure of the area of the optical entrance aperture is the same as the measure of the area of the light acceptance region, and since the measure of the area of the optical exit aperture is the same as the measure of the area of the target region, concentration ratio is alternatively defined herein as a ratio of the area of the light acceptance region of the concentrator to the area of the target region of the concentrator. As mentioned previously herein, high concentration is desired in mobile optical communication link applications. Unfortunately, previously known non-imaging concentrators having low aspect ratios and wide acceptance also have low concentration ratios, as revealed by inspecting the concentrators shown in FIG. 1. While all of the CPC type non-imaging concentrators shown in FIG. I have equal exit apertures, those with low aspect ratios also have relatively small entrance apertures, and therefore have relatively small concentration ratios. Accordingly, there are some design trade-offs between aspect ratio, field of view, and concentration ratio.

Some two-stage non-imaging concentrator designs having a non-imaging reflecting stage and a non-imaging refracting stage provide higher concentration ratios than the single stage non-imaging concentrators shown in FIG. 1. For example, at pages 77 to 79 of their text, Welford and Winston teach such a two stage non-imaging concentrator. FIG. 2 shows a cross sectional view of a similar two stage non-imaging concentrator, which has an acceptance angle, θ, an entrance aperture for providing a light acceptance region, A, a exit aperture for providing a target region, T, and a transparent dielectric material having a refractive index, n, in the refracting stage. Light incident to the reflecting stage at an angle, θ', is refracted at an another angle, θ", as shown in FIG. 2 before being concentrated at the exit aperture. The two stage non-imaging concentrator shown in FIG. 2 increases concentration ratio by a factor related to the refractive index, n, in contrast with a comparable single stage non-imaging concentrator as in FIG. 1 having a similar acceptance angle and exit aperture.

While high refractive index materials advantageously provide for high concentration ratios, there exist only limited choices of practical and affordable materials that also have relatively high refractive indices. Many plastics and ordinary glasses have refractive indices within a range from 1.5 to 1.6. Titanium dioxide ($TiO_2$) having a refractive index of 2.2 suggests a strong upper bound on the refractive index of practical dielectric materials, with materials having refractive index of 1.6 being more likely choices. Therefore, there are practical limitations on concentration ratio increases that can be achieved with previously known two stage non-imaging concentrator designs.

By following teachings of the prior art to make the refracting dielectric stage of the two stage non-imaging concentrator as short as possible, while maintaining the highest possible concentration ratio for a given exit aperture, the two stage non-imaging concentrator design shown in FIG. 2 has an aspect ratio that is always higher than that of a single stage non-imaging concentrator of FIG. 1 having a similar acceptance angle and exit aperture. For example, a two stage non-imaging concentrator as in FIG. 2 employing a 1.6 refractive index material, having an acceptance angle, plus or minus θ, of plus or minus thirty degrees, and a concentration ratio of approximately 10.4 is burdened by an aspect ratio of 19.16, which is larger than the aspect ratio of a single stage non-imaging concentrator of FIG. 1 having a similar acceptance ratio and exit aperture. Dividing the concentration ratio of the two stage concentrator of FIG. 2 by the aspect ratio of the two stage concentrator of FIG. 2 yields a figure of merit of approximately 0.53.

From the foregoing, it should be understood that while previously known non-imaging concentrators provide some advantages, they also have some limitations. What is needed is a two stage non-imaging concentrator that provides high concentration while also providing a low aspect ratio and a wide field of view.

SUMMARY OF THE INVENTION

A two stage non-imaging optical concentrator of the invention provides high concentration while providing a low aspect ratio and a wide field of view, in comparison to previously known two stage non-imaging concentrators. In applications such as mobile optical communications links, high concentration is needed to maximize signal to noise ratio and thereby maximize data rate. The wide acceptance angle of the invention provides a wide field of view, which is needed to maintain optical communication with the concentrator without being burdened by maintaining precise orientation of the concentrator.

Briefly and in general terms, the two stage non-imaging concentrator of the invention includes a non-imaging refractive member and a non-imaging reflective funnel member. In the preferred embodiment, the refractive member has a truncated portion that is substantially flat and provides for the exit aperture of the two stage concentrator. The reflective funnel has a broad extremity and an opposing narrow extremity. The non-imaging refractive member is disposed substantially within the funnel, proximate to the narrow extremity of the funnel, so as to provide a low aspect ratio of the two stage non-imaging concentrator of the invention. The low aspect ratio of the concentrator of the invention advantageously provides for compact and efficient packaging of the concentrator in conjunction with mobile optical communication link components.

Preferably, the non-imaging refractive member includes a non-imaging toric lens. The preferred shape of the surface of the toric lens is a toroidal surface that is substantially as described or "generated" in geometric terms by rotation of a truncated ellipse about an axis of symmetry of the lens. The truncated ellipse is tilted with respect to an axis of symmetry of the toric lens by an angle substantially equal to the acceptance angle of the concentrator.

A focus of the ellipse is preferably disposed at the flat truncated portion of the lens and is shifted away from the axis of symmetry by an amount substantially equal to a half the diameter of the exit aperture of the two stage concentrator. Mathematical simulations of the preferred embodiment of the toric lens within the funnel show that the shape substantially generated by rotating the tilted, truncated ellipse provides better light concentration than other lens configurations disposed within the funnel.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 3:
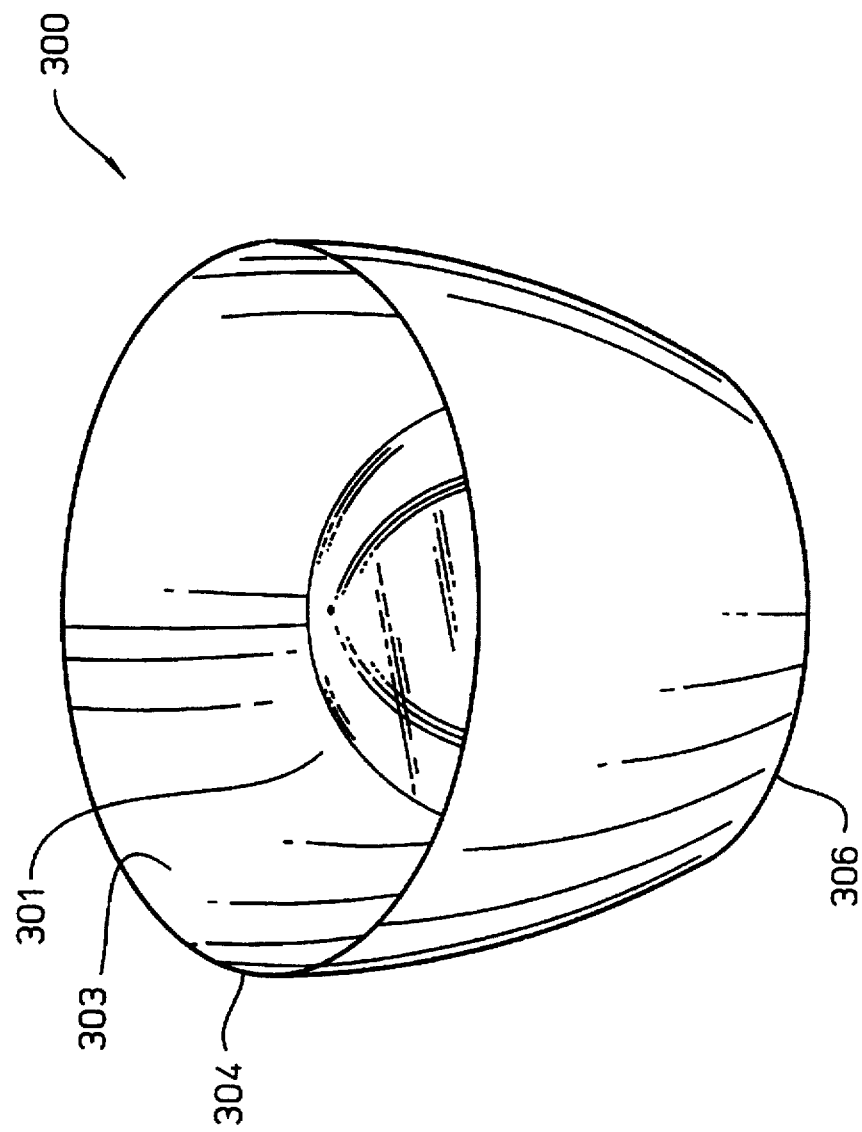
FIG. 3 shows a preferred embodiment of a two stage non-imaging concentrator of the invention.

FIG. 3 shows a preferred embodiment of a two stage non-imaging concentrator 300 of the invention. As shown, the concentrator is radially symmetric about an axis of symmetry. The two stage concentrator of the invention includes a non-imaging refractive member 301 of a suitably shaped transparent refractive material, preferably molded acrylic plastic or epoxy, and a non-imaging reflective funnel member 303, preferably molded aluminum or aluminum-coated plastic.

The non-imaging refractive and reflective members comprising the two stage non-imaging concentrator of the invention do not form images, but are designed to provide high concentration of light. Accordingly, the non-imaging members of the invention are defined herein as optical members that concentrate incident light by reflection or refraction, and that are incapable of forming images from the incident light. In contrast, imaging concentrators, such as classical spherical lenses (thin or thick) and reflective parabolic dishes form images, and are far from optimal in achieving high concentration of light for a wide field of view. Accordingly, it should be understood that the refractive material of the non-imaging refractive member of the invention is shaped to be substantially different from any classical spherical or parabolic lens, or any modified spherical or parabolic lens derived therefrom, which are previously known in the art. The non-imaging refractive member preferably includes a non-imaging toric lens comprising a refractive material having a toroidal surface.

As shown in FIG. 3, the reflective funnel has a broad extremity 304 and an opposing narrow extremity 306. As shown, the toric lens of the preferred embodiment is disposed substantially within the funnel, proximate to the narrow extremity of the funnel, so as to provide a reduced aspect ratio of the two stage concentrator. In particular, in the preferred embodiment shown, a bulk of the lens is disposed within the funnel.

The two stage concentrator of the invention is preferably operated in a spatial concentration mode wherein light is first received by the broad extremity 304 of the reflective funnel. The light then undergoes two concentration stages, and is transmitted through the narrow extremity 306 of the reflective funnel. Due to a tapered shape of a reflective inner surface of the funnel, the light undergoes a first stage of concentration within the reflective funnel before reaching the toric lens. As the light encounters the surface of the toric lens and is transmitted therethrough, the light undergoes a second stage of concentration. The two stage concentrator of the invention is alternatively operated in an angular concentration mode wherein light is first received over a broad range of incident angles at the narrow extremity 306 of the reflective funnel, the light then undergoes two angular concentration stages, and is transmitted through the broad extremity 304 of the reflective funnel over a narrow range of angles.

Figure 4:
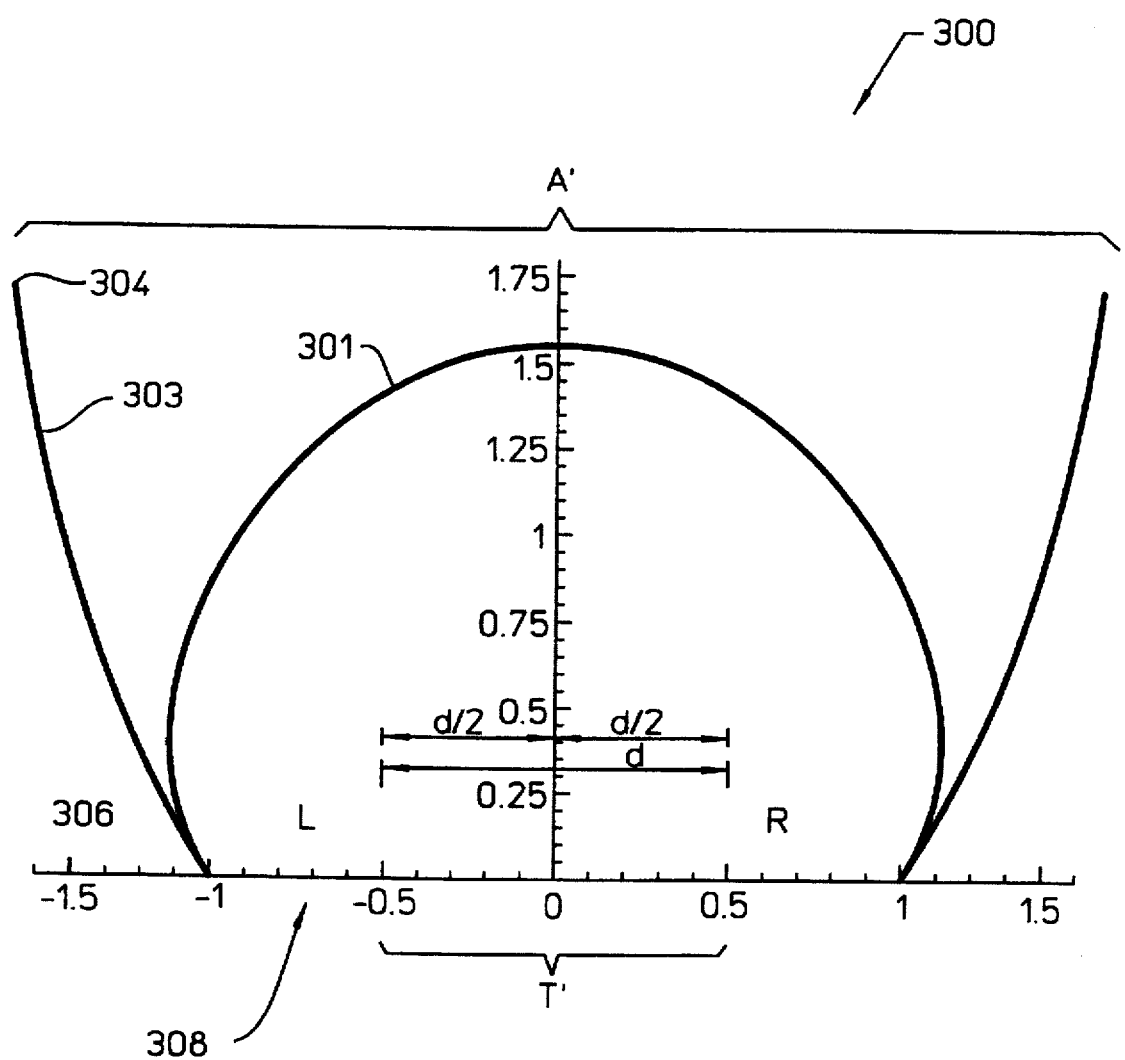
FIG. 4 shows a cross sectional view of the concentrator of FIG. 3.

FIG. 4 shows a cross sectional view of the preferred embodiment of the concentrator 300 shown in FIG. 3. The two stage concentrator has an optical entrance aperture to provide a light acceptance region, A', of the concentrator. The broad extremity 304 of the reflective funnel is integrally coupled with the entrance aperture of the two stage concentrator.

Field of view of the concentrator is defined by the acceptance angle, θ, of the concentrator. The two stage non-imaging concentration of the invention has a wide field of view, which is advantageous for maintaining optical communication with the concentrator without being burdened by maintenance of a precise orientation of the concentrator. For example, in the preferred embodiment shown in the FIGS. 3 and 4, and elsewhere in some of the subsequent figures, the field of view of the lens is within an angular extent of plus or minus the angle, θ, and more particularly within plus or minus thirty degrees.

The concentrator further has an optical exit aperture to provide a light target region T' of the concentrator. As shown in cross section in FIG. 4, the toric lens 301 has a flat truncated portion 308 that is integrally coupled with the exit aperture of the two stage concentrator. In the preferred embodiment, the optical exit aperture and the corresponding target region T' are each substantially circular, having diameter, d. In the preferred embodiment, the optical exit aperture and the corresponding circular target region each have an area that is substantially smaller than the area of the flat circular truncated portion of the lens, and substantially smaller than the area of the narrow extremity of the funnel. To provide efficient concentration and reduced aspect ratio, in the preferred embodiment, the optical exit aperture and the corresponding target region each have an area that is within a range of approximately a hundredth and approximately two thirds of the area of the flat truncated portion of the lens, and preferably is approximately one fourth the area of the flat truncated portion of the lens. The optical entrance aperture of the concentrator provides the light acceptance region for gathering light. The gathered light is concentrated onto the target region provided by the optical exit aperture.

Aspect ratio of a concentrator is defined as a ratio of the height dimension of the concentrator to the diameter of the optical exit aperture of the concentrator. Since the measure of the diameter of the optical exit aperture is the same as the measure of the diameter of the target region, the aspect ratio of the concentrator is alternatively defined as a ratio of the height dimension of the concentrator to the diameter of the target region provided by the optical exit aperture. The two stage non-imaging concentrator of the invention has a low aspect ratio to advantageously provide for compact and efficient packaging of mobile optical communication link components. For example, in the preferred embodiment, the two stage concentrator of the invention has an aspect ratio of approximately 1.78. In FIG. 4 a horizontal axis is shown in addition to the axis of symmetry, and normalized demarcations are shown on the axes to illustrate the low aspect ratio of the concentrator of the invention.

Concentration ratio is defined herein as a ratio of the area of optical entrance aperture of the concentrator to the area of the optical exit aperture of the concentrator. Since the measure of the area of the optical entrance aperture is the same as the measure of the area of the light acceptance region, and since the measure of the area of the optical exit aperture is the same as the measure of the area of the target region, concentration ratio is alternatively defined herein as a ratio of the area of the light acceptance region of the concentrator to the area of the target region of the concentrator. The two stage non-imaging concentrator of the invention provides high concentration ratio, which is desired in mobile optical communication link applications. For example, in the preferred embodiment, the two stage non-imaging concentrator of the invention has a concentration ratio of approximately 8.25. In FIG. 4 normalized demarcations are shown on the horizontal axes to illustrate the high concentration ratio of the concentrator.

Figure 1:
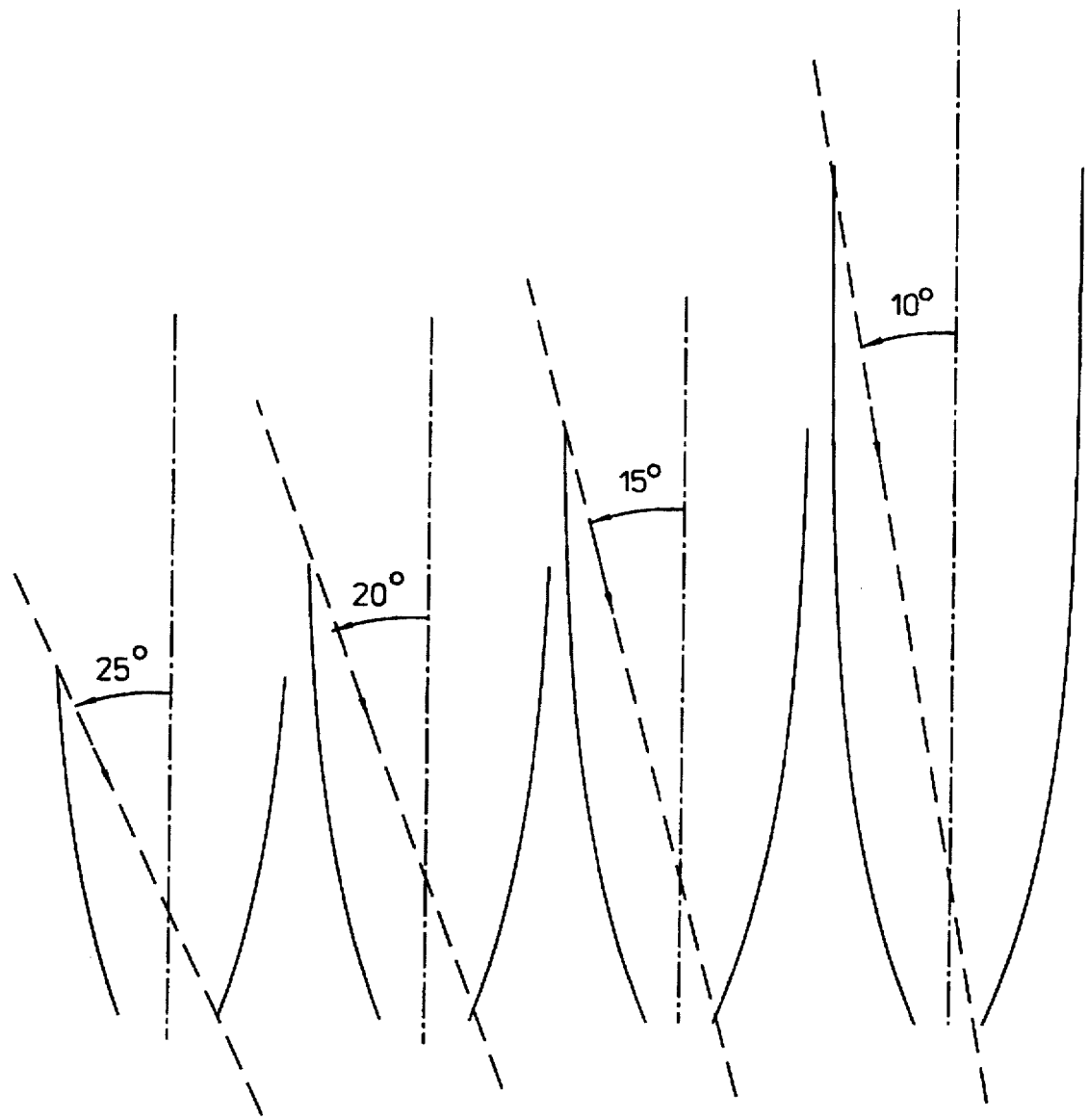
FIG. 1 shows a cross sectional view of previously known single stage non-imaging concentrators having various height dimensions and corresponding light ray acceptance angles.
Figure 2:
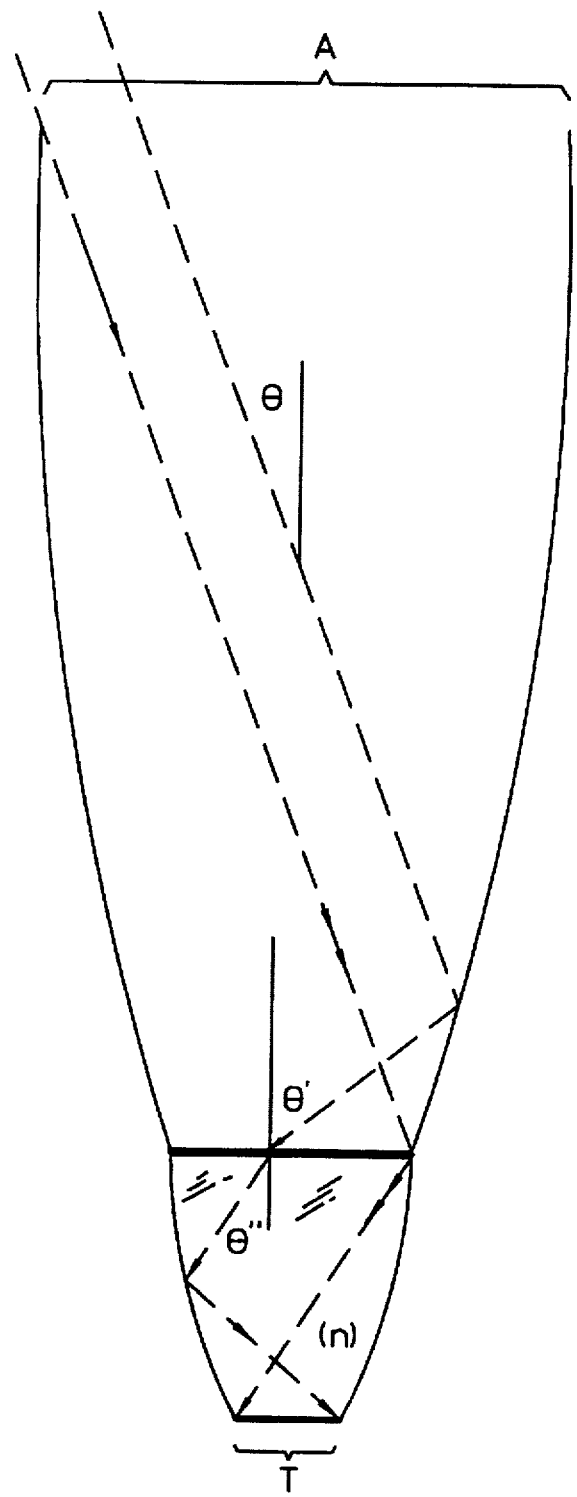
FIG. 2 shows a cross sectional view of a previously known two stage non-imaging concentrator.

As discussed, the preferred embodiment has a desirable high concentration ratio of approximately 8.25 and a desirable low aspect ratio of approximately 1.78. Dividing the concentration ratio of the preferred embodiment by the aspect ratio of the preferred embodiment yields a preferred high figure of merit of approximately 4.63. The invention compares very favorably with the previously known two stage non-imaging concentrator shown in FIG. 2, employing a comparable refractive index material, field of view, and concentration ratio, but having a less desirable high aspect ration of 19.16, and a less desirable low figure of merit of only approximately 0.53.

The preferred shape of the surface of the toric lens 301 is substantially as described or "generated" in geometric terms by rotation of a truncated ellipse about an axis of symmetry. The truncated ellipse is tilted with respect to the axis of symmetry by an angle substantially equal to the acceptance angle of the concentrator. Focus points of the rotated ellipse, for example right and left focus points, R, L, shown in the cross sectional view of FIG. 4, are preferably disposed at the flat truncated portion of the lens. As shown, the focus points are each shifted away from the axis of symmetry of the toric lens by an amount substantially equal to half of the diameter, d/2, of the optical exit aperture of the two stage concentrator. Mathematical simulations of the preferred embodiment of the toric lens within the funnel show that the shape substantially generated by rotating the tilted, truncated ellipse provides better light concentration than other lens configurations disposed within the funnel.

FIGS. 5A, 5B, 6, and 7 are partial schematic diagrams illustrating optical principles in operation of the invention. The invention advantageously employs optical principles such as Snell's law and Fermat's principle of least time. For purposes of illustration a truncated elliptical lens is shown in two dimensions in FIG. 5A. For illustrative purposes only, a dashed line is drawn around a flat truncated region of the elliptical lens as an aide to visualizing the elliptical shape of the lens of FIG. 5A.

Figure 5A:
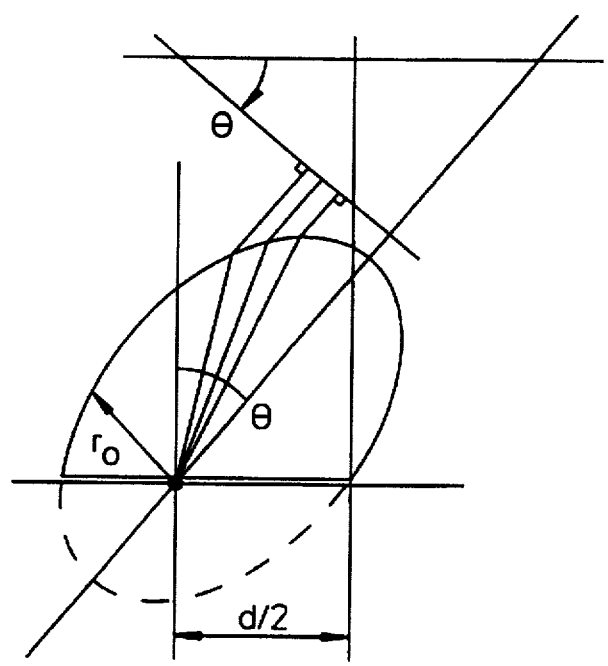
FIGS. 5A, 5B, and 6 are partial schematic diagrams illustrating optical principles in operation of the invention.
Figure 5B:
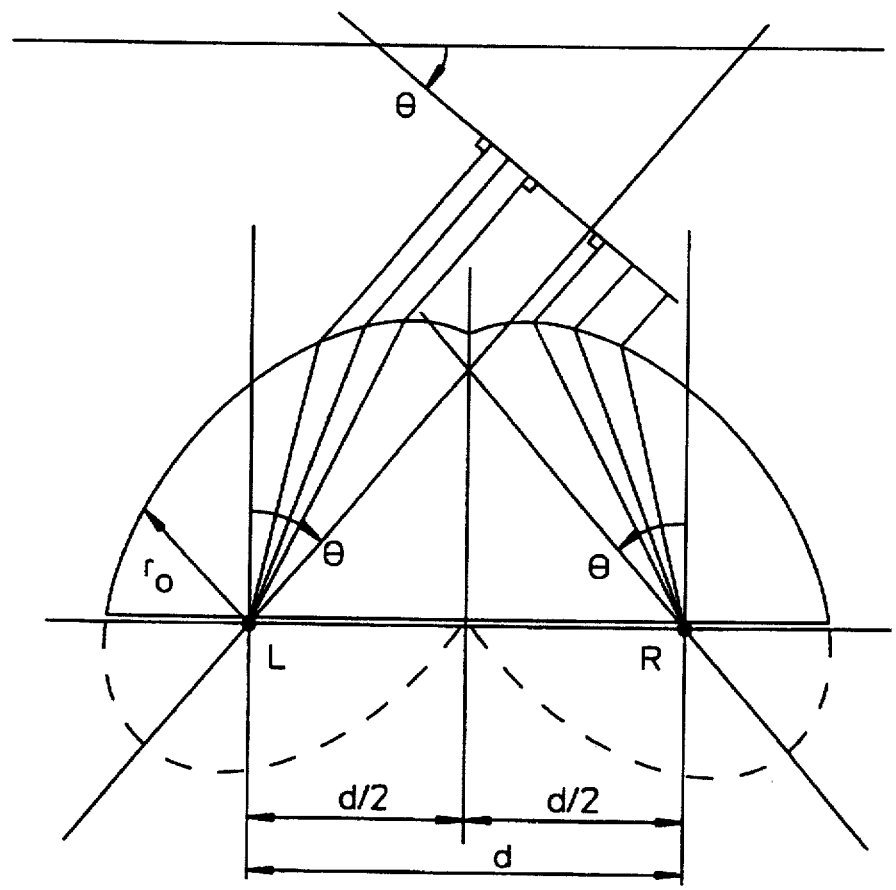

The truncated elliptical lens is tilted by an angle, θ, so that the field of view defined by the acceptance angle of the lens is within an angular extent of plus or minus the angle, θ. To illustrate optical principles of the invention a hypothetical construct of a luminous rod tilted from horizontal by an angle, θ, is drawn in the figures, and parallel light rays are drawn as emitted perpendicular from the luminous rod. According to the teachings of the invention, the truncated and tilted elliptical lens focusses parallel incident light rays to a point within or on the flat truncated region of the lens. As shown in FIG. 5A, rays coming from the right at a maximal angle, θ, are directed to a focus, L, of the elliptical lens. As shown, the focus of the elliptical lens is a distance, d/2, from the vertical axis. As discussed subsequently herein, the vertical axis is a rotational axis of symmetry for generating the toroidal surface of the lens. FIG. 5 further shows the minor semi-axis of the ellipse, $r_0$.

Figure 6:
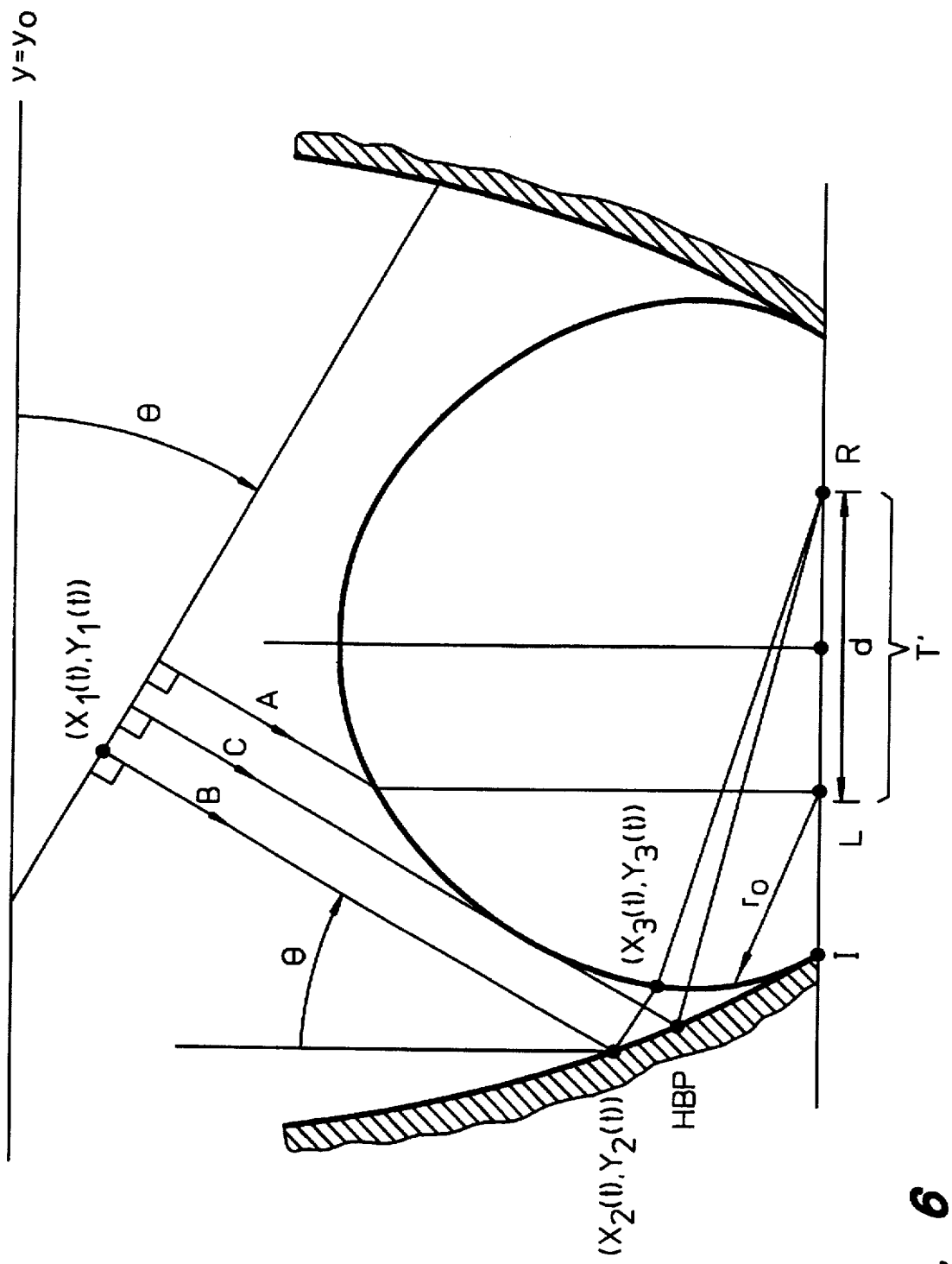

Rotating the tilted truncated elliptical lens about the selected vertical axis sweeps out the toric lens surface as shown in cross sectional view in FIG. 6. For illustrative purposes only, dashed lines are drawn around a flat truncated region of the toric lens shown in FIG. 6 as an aide to visualizing the description of rotating the truncated elliptical shape of FIG. 5. As shown in cross section in FIG. 6, the furthest left and furthest right shapes suggest mirrored images of the rotated elliptical lens. As further shown in cross section in FIG. 6, the corresponding furthest left and furthest right optical foci designated L and R are located at −d/2 and +d/2 on the horizontal axis, which lies along the flat truncated region of the toric lens. The target region diameter d is the distance between the optical foci. Accordingly all rays of angular extent between plus and minus the angle, θ, that are incident to the curved side of the lens are directed by the lens to fall between a distance, −d/2, and another opposing distance, +d/2, from the selected vertical axis, so that centrally positioning the target region of this diameter at the truncated flat surface of the lens will intercept the light rays. FIG. 5B again shows the minor semi-axis of the ellipse, $r_0$.

It should be particularly noted that the diameter, d, depends on the radius of the minor axis of the ellipse, the tilt angle of the ellipse, and the choice of selected vertical axis of rotation. In the preferred embodiment of the toric lens, the refractive index of the material is specified, the diameter, d, is specified as a normalization length, and the radius of the minor axis is selected to be slightly less than a value of the diameter times the cosine of the angle, θ, thereby customizing the radius to maximize concentration ratio and minimize height of the concentrator for a desired field of view. In general, there is a slight cusp indentation at the center of the lens's top surface, since the surface of the toric lens is substantially described or "generated" in geometric terms by rotation of a truncated ellipse about the vertical axis of symmetry of the concentrator. However this indentation does not substantially affect performance of the concentrator and is smoothed over in some embodiments.

FIG. 6 shows cross sectional view of the toric lens substantially disposed within the reflective funnel. Parallel rays are shown emitted from the hypothetical luminous rod and incident on the concentrator from the right at a maximal angle, θ. Such rays that strike the lens directly, without being redirected by the reflector, such as a first light ray, A, in the diagram, are directed by the lens to the left focus L. Another light ray, B, coming from the right, first encounters the reflective inner surface of the funnel, is redirected by the reflection to the lens, which then directs the light ray to the right focus, R.

Snell's Law and the Fermat principle of least time are applied in the invention to define a shape of the reflective inner surface of the funnel. As shown in FIG. 6, the reflective inner surface of the funnel is proximate to the toric lens at a point, I, near a rim of the flat truncated region of the toric lens, so as to promote effective concentration of the light entering the broad extremity of the funnel by advantageously employing reflection and refraction. Yet another light ray, C, has potential of either being directly refracted to the focus, L, by the lens, or being first reflected by the inner surface of the funnel and then being directed by the lens to the other focus, R. As shown, this ray, C, is incident to the reflective inner surface of the funnel at what is designated as a high blind point, HBP, of the concentrator. Slope of the reflective inner surface of the funnel is preferably constant from the proximate point, I, to the high blind point, HBP.

Within a region extending from the high blind point, HBP, to the broad extremity of the funnel, paths of light rays incident to the region of the funnel, can be traced backwards from the focus and out of the lens by application of Snell's law and Fermat's principle of least time. A rigorous mathematical discussion follows, further explaining operation of the invention, the shape of the reflective inner surface of the funnel, and the shape of the toroidal surface of the lens.

A mathematical parameter, t, is used in the following discussion. In FIG. 6, a locus of points of the luminous rod is described by a first pair of co-ordinates expressed in parameterized form, $(X_1(t), Y_1(t))$. A locus of points of the reflective inner surface of the funnel is described by a second pair of co-ordinates expressed in parameterized form, $(X_2(t), Y_2(t))$. A locus of points of the toroidal surface of the lens is described by a third pair of co-ordinates expressed in parameterized form, $(X_3(t), Y_3(t))$.

The perpendicular relationship between the extremal ray and the luminous rod is expressed as:

$$x_2(t) - x_1(t) = \tan\theta (y_2(t) - y_1(t))$$

where $$x_1(t) = t\cos\theta$$

and $$y_1(t) = y_0 - t\cos\theta$$

The surface of the lens is described by the following equation:

$$((n^2 - \sin^2\theta)x_3^2(t) + (d(n^2 - \sin^2\theta) - 2\sqrt{n^2-1}\ r_0\sin\theta)x_3(t) +$$

$$(n^2 - \cos^2\theta)y_3^2(t)) - ((d\sin\theta\cos\theta + 2\sqrt{n^2-1}\ r_0\cos\theta)y_3(t) -$$

$$2\sin\theta\cos\theta x_3(t)y_3(t)) = (n^2-1)r_0^2 - (n^2-\sin^2\theta)\frac{d^2}{4} + \sqrt{n^2-1}\ r_0 d\sin\theta$$

Fermat's principle of least time provides:

$$(\sqrt{(x_2(t)-x_1(t))^2 + (y_2(t)-y_1(t))^2}\ ) +$$

$$(\sqrt{(x_3(t)-x_2(t))^2 + (y_3(t)-y_2(t))^2}\ ) +$$

$$\left(n\sqrt{\left(x_3(t)-\frac{d}{2}\right)^2 + y_3^2(t)}\ \right) = C$$

where C is a constant.
Defining the function $\theta_n(x,y)$ as follows:

$$\theta_n(x,y) = \tan^{-1}\left(\frac{2(n^2-\cos^2\theta)y - (d\sin\theta\cos\theta + 2\sqrt{n^2-1}\ r_0\cos\theta) - 2\sin\theta\cos\theta x}{2(n^2-\sin^2\theta)x + (d(n^2-\sin^2\theta) - 2\sqrt{n^2-1}\ r_0\sin\theta) - 2\sin\theta\cos\theta y}\right)$$

Snell's law is written in terms of the function $\theta_n(x,y)$, substituting suitable values for parameterized variables $X_3(t)$ and $Y_3(t)$, as:

$$\sin(\tan^{-1}((y_3(t)-y_2(t))/(x_3(t)-x_2(t))) - \theta_n(x_3(t),y_3(t))) =$$

$$n \sin\left(\tan^{-1}\left(y_3(t)/\left(x_3(t)-\frac{d}{2}\right)\right) - \theta_n(x_3(t),y_3(t))\right)$$

Simultaneous solutions of these parametric equations provides rigorous description of the preferred reflective inner surface in terms of the solution for the locus of points $(X_2(t), Y_2(t))$, and rigorous description of the preferred toroidal surface of the toric lens in terms of the solution for the locus of points ($X_3(t)$, $Y_3(t)$). These equations were used in conjunction with very well known computer simulation and graphics software to draw FIGS. 7, 7A, and 7B, which show various views of the preferred embodiment of FIG. 3. It should be understood that while it is preferred that the surface of the reflector and the surface of the lens are substantially smooth, for the purposes of illustration only the surfaces are drawn in FIGS. 7, 7A, and 7B as tiled surfaces.

Figure 7:
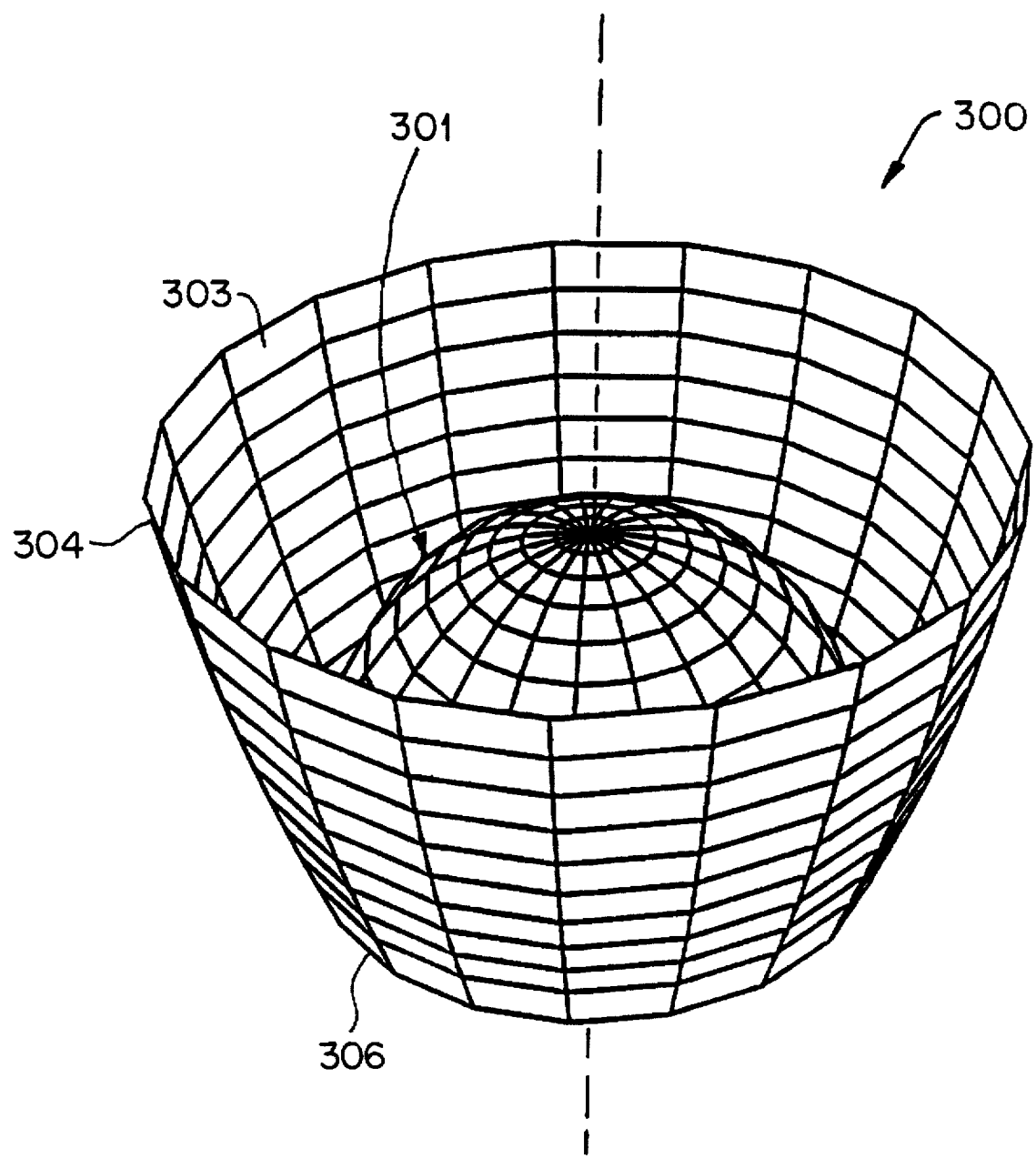
FIGS. 7, 7A, and 7B are various views of the preferred embodiment of the concentrator of FIG. 3.
Figure 7A:
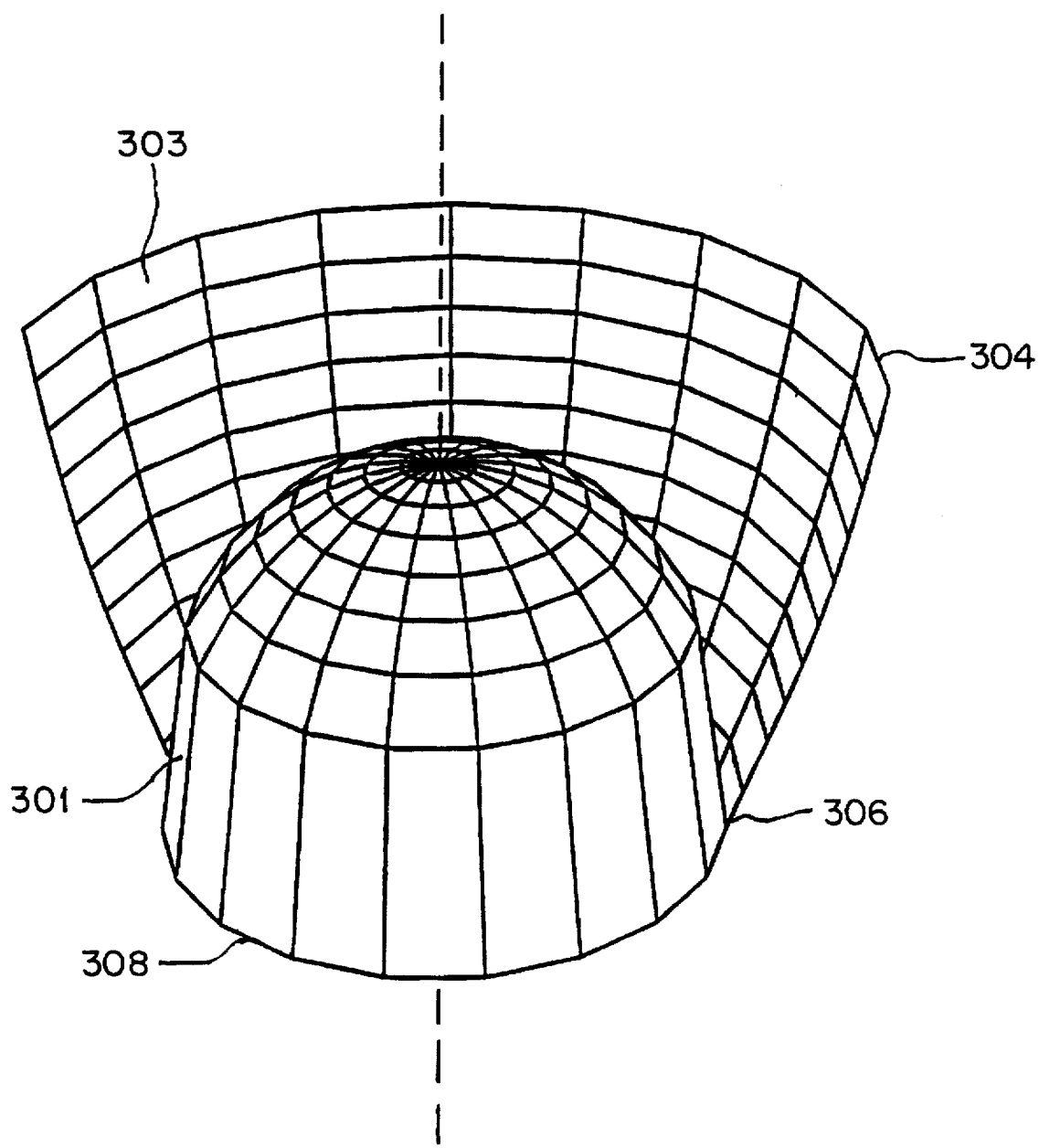
Figure 7B:
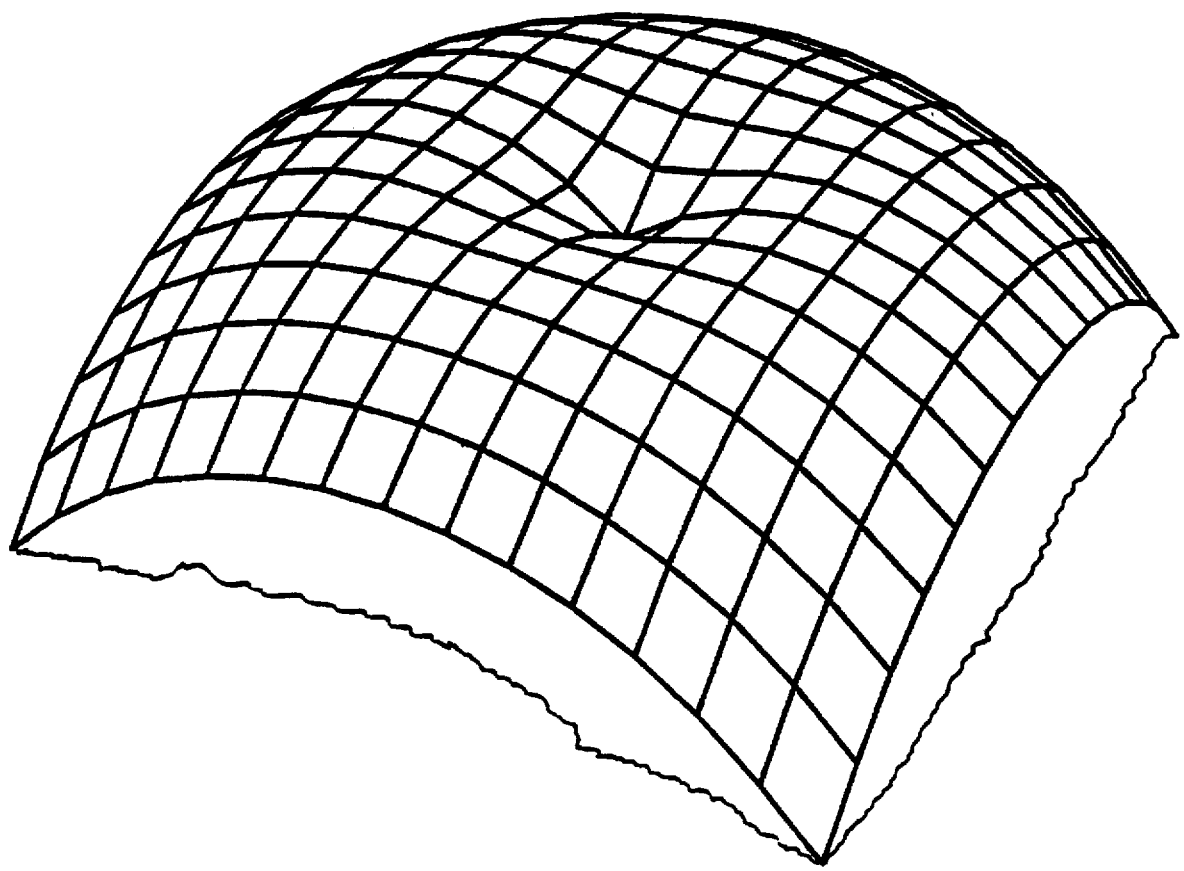

In particular, FIG. 7 shows an isometric view of the two stage concentrator 300 of FIG. 3, comprising the non-imaging toric lens 301 and the non-imaging reflective funnel 303, which as shown has the broad extremity 304 and the opposing narrow extremity 306. FIG. 7A is an isometric view of the two stage concentrator of the invention wherein a portion of the reflective funnel 303 is cut away to reveal the toric lens 301. As shown, in the preferred embodiment, the toric lens has a truncated portion 308 that is substantially flat and provides the exit aperture of the two stage concentrator. FIG. 7B is a detailed cut away isometric view particularly showing a preferred dimple feature at a top surface of the toric lens of the two stage concentrator. However it should be understood that the dimple feature in the top surface of the toric lens is not particularly pronounced and is not essential to operation of the invention.

The two stage non-imaging optical concentrator of the invention provides high concentration while providing a low aspect ratio and a wide field of view, in comparison to previously known two stage non-imaging concentrators. Although specific embodiments of the invention have been described and illustrated, the invention is not to be limited to the specific forms or arrangements of parts so described and illustrated, and various modifications and changes can be made without departing from the scope and spirit of the invention. For example, in alternative embodiments the concentrator has a field of view of approximately plus or minus fifteen degrees. Within the scope of the appended claims, therefore, the invention may be practiced otherwise than as specifically described and illustrated.

What is claimed is:

1. An apparatus comprising:
    a two stage non-imaging concentrator including:
        a first stage of a non-imaging reflective funnel member having a broad extremity and an opposing narrow extremity, and
        a second stage of a non-imaging refractive member, wherein the non-imaging refractive member of the second stage is disposed substantially within the funnel of the first stage, proximate to the narrow extremity of the funnel, so as to provide a low aspect ratio of the two stage concentrator.

2. An apparatus as in claim 1 wherein:
    the two stage concentrator has an optical entrance aperture to provide a light acceptance region of the concentrator, and has an optical exit aperture to provide a light target region of the concentrator;
    the broad extremity of the reflective funnel is integrally coupled with the entrance aperture of the two stage concentrator; and
    the non-imaging refractive member has a truncated portion that is integrally coupled with the exit aperture of the two stage concentrator.

3. An apparatus as in claim 2 wherein the truncated portion of the refractive member is substantially flat.

4. An apparatus as in claim 1 wherein a bulk amount of the refractive member of the second stage is disposed within the funnel of the first stage.

5. An apparatus as in claim 1 wherein the refractive member of the second stage extends entirely through the funnel of the first stage.

6. An apparatus as in claim 2 wherein:
    the truncated portion of the refractive member has an area; and
    the optical exit aperture and the target region each have an area that is within a range of approximately a hundredth to approximately two thirds the area of the truncated portion of the refractive member.

7. An apparatus as in claim 6 wherein the optical exit aperture and the target region each have an area that is approximately one fourth the area of the truncated portion of the refractive member.

8. An apparatus comprising a two stage concentrator including:
    a non-imaging toric lens having a toroidal surface that is substantially generated by rotation of a substantially tilted truncated ellipse about an axis of symmetry of the toric lens; and
    a reflective funnel member having a broad extremity and an opposing narrow extremity, the non-imaging toric lens being disposed substantially within the funnel proximate to the narrow extremity of the funnel.

9. An apparatus as in claim 8, wherein:
    the two stage concentrator has a substantial light acceptance angle; and
    the truncated ellipse is tilted with respect to the axis of symmetry by an angle substantially equal to the light acceptance angle of the concentrator.

10. An apparatus as in claim 8 wherein a focus of the ellipse, proximate to where the ellipse is truncated, is substantially shifted away from the axis of symmetry of the toric lens.

11. An apparatus as in claim 8, wherein:
    the two stage concentrator has an exit aperture having a radius; and
    a focus of the ellipse is shifted away from the axis of symmetry by an amount substantially equal to half a diameter of the exit aperture of the two stage concentrator.

12. An apparatus comprising a non-imaging toric lens having a toroidal surface that is substantially generated by rotation of a truncated ellipse about an axis of symmetry of the toric lens, wherein a focus of the ellipse closest to where the ellipse is truncated, is substantially shifted away from the axis of symmetry of the toric lens.

13. An apparatus as in claim 12 further comprising a non-imaging reflective funnel member having a broad extremity and an opposing narrow extremity, the toric lens being disposed substantially within the funnel proximate to the narrow extremity of the funnel, so as to provide a two stage non-imaging concentrator having a low aspect ratio.

14. An apparatus as in claim 13 wherein:
    the two stage concentrator has an optical entrance aperture to provide a light acceptance region of the concentrator, and has an optical exit aperture to provide a light target region of the concentrator;
    the broad extremity of the reflective funnel is integrally coupled with the entrance aperture of the two stage concentrator; and
    the toric lens has a truncated portion that is integrally coupled with the exit aperture of the two stage concentrator.

15. An apparatus as in claim 14 wherein the truncated portion of the toric lens is substantially flat.

16. An apparatus as in claim 12 wherein the ellipse is substantially tilted with respect to the axis of symmetry.

17. An apparatus as in claim 13 wherein a bulk amount of the toric lens is disposed within the funnel.

18. An apparatus as in claim 12 wherein both foci of the ellipse are substantially shifted away from the axis of symmetry of the toric lens.

19. An apparatus as in claim 14 wherein:

the truncated portion of the toric lens has an area; and the optical exit aperture and the target region each have an area that is within a range of approximately a hundredth to approximately two thirds the area of the truncated portion of the toric lens.

20. An apparatus comprising:

a two stage concentrator having a substantial light acceptance angle and including:

a non-imaging toric lens having a toroidal surface that is substantially generated by rotation of a substantially tilted truncated ellipse about an axis of symmetry of the toric lens; and a reflective funnel member having an extremity optically coupled with the non-imaging toric lens;

wherein the truncated ellipse is tilted with respect to the axis of symmetry by an angle substantially equal to the light acceptance angle of the two stage concentrator.

* * * * *